Figure 1:
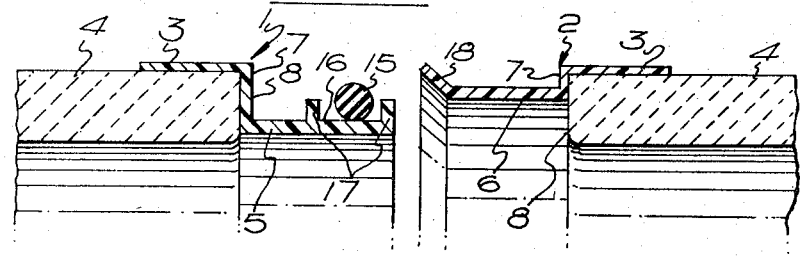

United States Patent [19]

Glover

[11] 3,830,530

[45] Aug. 20, 1974

[54] PIPE COUPLINGS

[75] Inventor: John Benjamin Glover, Sheffield, England

[73] Assignee: The Hepwerth Iron Company Limited, Sheffield, England

[22] Filed: May 3, 1973

[21] Appl. No.: 356,894

Related U.S. Application Data

[63] Continuation-in-part of Ser. No. 218,326, Jan. 17, 1972.

[30] Foreign Application Priority Data

Jan. 21, 1971  Great Britain .................. 2835/71

[52] U.S. Cl ............... 285/230, 285/231, 285/347, 285/DIG. 16
[51] Int. Cl. ..................... F16l 21/02, F16l 49/00
[58] Field of Search ........... 285/230, 231, 237, 260, 285/374, DIG. 16, DIG. 19, 110, 347

[56] References Cited
UNITED STATES PATENTS

| | | | |
|---|---|---|---|
| 3,129,961 | 4/1964 | Danko et al. ....................... | 285/230 |
| 3,195,928 | 7/1965 | Pasternack ....................... | 285/347 X |
| 3,195,928 | 7/1965 | Pasternack ....................... | 285/374 X |
| 3,212,797 | 10/1965 | Osweiler ........................... | 285/230 |
| 3,503,636 | 3/1970 | Bower .............................. | 285/374 X |
| 3,539,205 | 11/1970 | Johnson et al. .................. | 285/260 X |
| 3,640,552 | 2/1972 | Demler et al. .................... | 285/110 X |

FOREIGN PATENTS OR APPLICATIONS 1,014,303   8/1957   Germany ................. 285/DIG. 16

*Primary Examiner*—Mervin Stein
*Assistant Examiner*—David H. Corbin
*Attorney, Agent, or Firm*—Lowe, King and Price

[57] ABSTRACT

A pipe coupling for plain-end pipes, e.g., of fired clayware, comprises a pair of sleeves of resilient plastics material with cylindrical portions for securing on the pipe-ends and generally cylindrical joint forming portions adapted to extend beyond the pipe-ends, the joint forming portion of each sleeve being connected to its securing portion by any annular portion for abutting a pipe-end, and a sealing ring for compression between the joint forming portions, whereby the securing portions can yield to the profiles and diameters of the respective pipe-ends to which they are applied, while the joint forming portions substantially retain their generally cylindrical shapes, so that little tolerance need be allowed for in the sealing ring.

8 Claims, 2 Drawing Figures

PATENTED AUG 20 1974   3,830,530

PIPE COUPLINGS

This application is a continuation-in-part of my co-pending application Ser. No. 218,326 field Jan. 17, 1972.

The invention relates to pipe couplings, more particularly for joining plain-end (i.e., non-socketed) pipes, which may be of fired clayware or of asbestos-cement, pitch-fibre, or concrete, such as are used for sewers drains and cable conduit, and has for its object the provision of a pipe coupling capable of accommodating the appreciable tolerances on nominal diameter and irregularity of profile, e.g., ovality, encountered with fired clayware pipes, yet keeping the joint within the overall diameter of the pipes.

According to the present invention, a pipe coupling for joining plain-end pipes comprises a pair of sleeves of resilient plastics material, each sleeve having an annular portion for abutting one end of a plain-end pipe, a cylindrical portion for securing on the pipe-end extending from the outer periphery of the annular portion, and a generally cylindrical joint forming portion extending from the inner periphery of the annular portion, thus enabling the joint forming portions to extend from pipe-ends to be joined, the radial extents of the annular portions being less than the annular width of the pipe-ends and differing from each other, thus enabling one joint forming portion to fit inside the other, together with a resilient sealing ring for compression between the joint forming portions.

The securing portions yield to the profiles and diameters of the respective pipe-ends to which they are applied, while the joint forming portions substantially retain their generally cylindrical shapes, so that little tolerance need be allowed for in the sealing ring, and the overall diameter of the coupling exceeds the outside diameter of the pipes by substantially no more than twice the thickness of the securing portions to the sleeves, while the joint is kept within the overall diameter of the pipes.

The abutting of the annular portions of the sleeves against the pipe-ends affords positive location of the sleeves on the pipe ends.

The sealing ring is preferably housed in a groove on the outside of the inner joint forming portion, which groove is preferably formed by a pair of circumferential flanges one of which is at the free end of the inner joint forming portion, and the free end of the outer joint forming portion is preferably flared to provide a lead-in taper for effecting compression of the sealing ring when assembling the joint. The sealing ring allows for draw between the connected pipes.

The securing portions, and preferably the annular portions also, may be thinner than the remainder of the sleeves, to afford greater flexibility for accommodating themselves to pipe-ends to which they are applied, but in any case they are preferably secured both by being force fit on the pipe-ends and by the application of adhesive, which may extend also between the annular portions and the pipe-ends. The adhesive may be applied to the insides of the securing portions during manufacture of the sleeves, the adhesive being of the type capable of being reactivated by slight heat or application of a solvent or actuator prior to application of the sleeves to pipes on site. If the sleeves are intended to be applied to pipes having slightly bevelled or rounded pipe-ends, the sleeves may be provided with matching bevelled or rounded portions between the securing portions and the respective annular portions.

Reduction of pipe-ends by an amount up to the thickness of the securing portions of the sleeves is not precluded, but, as mentioned previously, the overall diameter of the joint will exceed the outside diameter of the pipes by substantially no more than twice the thickness of the securing portions of the sleeves if the pipe-ends are not reduced.

Figure 2:
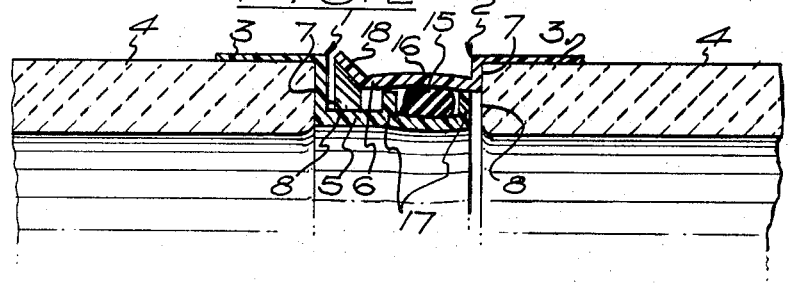

An embodiment of the invention will now be described in detail with reference to the accompanying drawings, in which:

FIG. 1 is a fragmentary view showing a pair of coupling sleeves according to the invention in longitudinal section on plain-end pipes and about to be moved into sealing engagement with each other; and FIG. 2 is a similar view with the coupling sleeves in sealing engagement with each other.

In the Figures a pipe coupling comprises a pair of sleeves 1, 2 of resilient plastics material, having cylindrical portions 3 for securing on the ends of plain-end fired clayware pipes 4 and generally cylindrical joint forming portions 5, 6 respectively, the joint forming portions being connected to the securing portions by annular portions 7 abutting the pipe-ends 8. The securing portions 3 and the annular portions 7 are thinner than the generally cylindrical joint forming portions 5, 6 to afford great flexibility to the securing portions for yielding to the profiles and diameters of the respective pipe-ends and thereby accommodating the appreciable tolerances on nominal diameter and irregularity of profile encountered, while the joint forming portions 5, 6 substantially retain their generally cylindrical shapes, so that little tolerance need be allowed for in a resilient sealing ring 15 compressed between the joint forming portions 5, 6 and housed in a groove 16 on the outside of the inner joint forming portion 5, the groove being formed by a pair of circumferential flanges 17 (one of which is at the free end of the inner joint forming portion), and the free end 18 of the outer joint forming portion 6 being flared to provide a lead-in taper for effecting compression of the sealing ring 15 when assembling the joint.

The sealing ring 15 allows for draw between the connected pipes 4.

What I claim is:

1. A pipe coupling for joining plain-end pipes comprising a pair of resilient sleeves, each sleeve including an annular portion having an inner and an outer periphery for abutting one end of a plain-end pipe, a cylindrical portion extending from the outer periphery of the annular portion for securing on an external surface of the pipe-end, said annular portion extending radially inwardly therefrom, and a generally cylindrical joint forming portion extending axially from the inner periphery of the annular portion, so that the joint forming portions extend from the pipe ends to be joined, the radial extent of one annular portion being smaller than the other, defining a larger joint forming portion and a smaller joint forming portion and each portion being smaller than the annular width of the pipe ends to enable the smaller joint forming portion to fit inside the larger, together with a resilient sealing ring for compression between the joint forming portions, said securing portions yielding to said pipe ends and said joint forming portions substantially retaining their generally cylindrical shape to compress said sealing ring.

2. A pipe coupling as in claim 1, wherein the sealing ring, is housed in a groove on the outside of the smaller joint forming portion.

3. A pipe coupling as in claim 2, wherein the groove is formed by a pair of circumferential flanges one of which is at the free end of the smaller joint forming portion.

4. A pipe coupling as in claim 2, wherein the free end of the larger joint forming portion is outwardly flared to provide a lead-in taper for effecting the compression of the sealing ring when assembling the coupling.

5. A pipe coupling as in claim 1, wherein the securing portions are thinner than the remainder of the sleeves.

6. A pipe coupling as in claim 1, wherein the securing portions and the annular portions are thinner than the remainder of the sleeves.

7. A pipe coupling as in claim 1, wherein the insides of the securing portions are coated with an adhesive of the type capable of being reactivated prior to application of the sleeves to pipes on site.

8. A pipe coupling for jointing plain-end pipes comprising a pair of resilient sleeves, each sleeve including an annular portion having an inner and outer periphery for abutting one end of a plain-end pipe, a cylndrical portion extending from the outer periphery of the annular portion for securing on an external surface of the pipe end, said annular portion extending radially inwardly therefrom, and a generally cylindrical joint forming portion extending axially from the inner periphery of the annular portion so that the joint forming portions extend from the pipe ends to be joined, the radial extent of one annular portion being smaller than the other to define a larger joint forming portion and a smaller joint forming portion, and each portion being smaller than the annular width of the pipe ends to enable the smaller joint forming portion to fit inside the larger, together with a resilient sealing ring for compression between the joint forming portions, said ring being housed in a groove on the outside of the smaller joint forming portion, a free end of the larger joint forming portion being outwardly flared to provide a lead-in taper for effecting the compression of the sealing ring between the joint forming portions when assembling the coupling.

* * * * *